United States Patent [19]

Loeb

[11] Patent Number: 4,999,621
[45] Date of Patent: Mar. 12, 1991

[54] TONE CODE IDENTIFICATION SYSTEM

[75] Inventor: Warner Loeb, Port Jefferson, N.Y.

[73] Assignee: IDX Technologies, Inc., E. Setauket, N.Y.

[21] Appl. No.: 385,426

[22] Filed: Jul. 27, 1989

[51] Int. Cl.⁵ .......................... G06F 3/00; H04M 3/00
[52] U.S. Cl. ................... 340/825.34; 340/571; 364/222.5
[58] Field of Search ............. 340/825.34, 539, 825.36, 340/571, 572, 825.71, 825.73, 825.75, 825.49, 870.09, 825.44; 364/222.5, 918.7; 379/106, 108, 109

[56] References Cited
U.S. PATENT DOCUMENTS

| | | |
|---|---|---|
| 3,778,781 | 2/1973 | Roth . |
| 4,223,830 | 9/1980 | Walton ........................... 340/825.34 |
| 4,563,680 | 1/1986 | Nakajima ....................... 340/825.44 |
| 4,644,345 | 2/1987 | Wycoff .......................... 340/825.71 |
| 4,656,463 | 4/1987 | Anders et al. .................. 340/870.09 |

Primary Examiner—Kenneth Wieder
Assistant Examiner—Peter S. Weissman
Attorney, Agent, or Firm—Kirschstein, Ottinger, Israel & Schiffmiller

[57] ABSTRACT

A tone code identification system identifies a stolen computer every time the same is turned on. Police, on recovering a stolen computer, can call a central registry and transmit the tone code to reveal the identity of the rightful owner.

13 Claims, 2 Drawing Sheets

TONE CODE IDENTIFICATION SYSTEM

BACKGROUND OF THE INVENTION

1. This invention generally relates to a registration system for portable articles of personal property, particularly personal computers and laptop computers and, more particularly, to an identification system for readily identifying the rightful owner of stolen articles of personal property which have been recovered by law enforcement authorities or agencies.

2. Description of Related Art

To deter crime, especially the theft of articles of personal property from households by burglars, it has been proposed, for example, in U.S. Pat. No. 4,336,754, to physically mark articles of personal property with identification codes which may readily be correlated with registered owners of the articles. The registered owner etches or engraves the code on the article with the aid of a tool and a stencil guide. A registry assigns a unique code for each owner and keeps a record of the assigned rightful owners. In the event that law enforcement personnel recover such etched or engraved stolen property, the registry can inform the law enforcement personnel as to the identity of the rightful owner so that arrangements can be made to return the stolen property.

Although generally satisfactory for its intended purpose of deterring theft, experience has shown that physical marking schemes have not proven altogether desirable or effective in practice, because thieves often remove or deface the etched or engraved codes from the articles of personal property sought to be protected. As a result, any such recovered goods cannot be readily traced back to the rightful owner because the significance of the marking after having been removed or defaced is not readily apparent to law enforcement personnel.

Personal computers or laptop computers, because of their increasing popularity and highly portable nature, are particularly susceptible to theft. For multi-component computers, computer thieves typically steal only the main processor, leaving behind the extra weight of the less valuable keyboard and monitor. Experience has shown, however, that many users forget to mark the main processor or forget to mark all of the components of the computer, thereby failing in the main objective of deterring theft.

SUMMARY OF THE INVENTION

1. Objects of the Invention

It is a general object of this invention to deter the theft of articles of personal property, particularly electrically-activatable, portable articles such as personal computers that have an internal hard disk, and laptop computers with or without hard disks.

It is another object of this invention to facilitate the identification of the rightful owner of such stolen personal property which has been recovered by law enforcement personnel or others.

A further object of this invention is to eliminate the need to, and the bother of, having to physically and manually mark such personal property by etching or engraving a code thereon.

Still another object of this invention is to facilitate the return of such stolen personal property to the rightful owner.

Yet another object of this invention is to effectively prevent a thief from removing or tampering with a code assigned to such personal property.

2. Features of the Invention

In keeping with these objects, and others which will become apparent hereinafter, one feature of this invention resides, briefly stated, in a property identification system for readily identifying the rightful owner of stolen personal property which has been recovered by law enforcement personnel or others. Within the context of this invention, the personal property is portable, and activatable by electrical power and, in addition, has a sound emitter, e.g. a speaker, operative for converting electrical signals to acoustic signals. Typical examples of personal property contemplated as being suitable for identification by this invention are personal computers, especially with a built-in hard disk, and laptop computers with or without such hard disks. Such computers have on-board or built-in local speakers which can be driven typically by a built-in microprocessor to emit a sound or audible tone. Sophisticated television sets, radios, stereo equipment, etc each having a speaker or microprocessor, can also be registered and protected by the identification system disclosed herein.

The identification system according to this invention includes means for incorporating unique identification codes with the activatable, portable articles of personal property. Each code is a different combination of symbols indicative of a registered owner of a respective article.

The system further includes tone means for energizing a sound emitter associated with each article. The sound emitter is energized to emit a unique plurality of audible tones upon activation of the respective article. Each tone corresponds to a respective symbol of the corresponding code incorporated with the respective article. The emission of the tones serves as a notification that the respective article has a registered owner.

In a preferred embodiment, at least one symbol, and preferably a first group of the symbols, constitutes a master symbol identifying a specific master code list or registry. Law enforcement personnel have been alerted to recognize the emission of master tones corresponding to the master symbol with that registry and with a telephone number to telephone that registry.

When the article is a computer having an on-board speaker and an on-board memory such as a hard disk, the incorporating means and tone means are advantageously constituted as a program on a diskette which can be loaded into a disk drive of the computer. The program includes an installation routine whereby the program installs itself on the computer's hard disk. The portion of the program which drives the speaker to emit the tones is installed at the beginning of the computer's start-up file. In the MS-DOS operating system, the start-up file is known as the AUTOEXE.BAT file. The tones corresponding to the assigned code will sound every time the computer is turned on.

Another feature, which is of particular benefit when the computer is recovered intact with a monitor or display screen and a keyboard, resides in visually displaying the code on the monitor screen when a predetermined word is typed on the keyboard by law enforcement personnel. Specifically, the aforementioned first group of symbols is identical for all the codes and is constituted by the alphabetic letters "C", "O" and "P". The remainder of the program, which is installed in the root directory of the computer, instructs the microprocessor to display the code on the monitor screen whenever the word "COP" is typed on the keyboard.

Computer thieves typically steal only the main processor of the computer, leaving behind the extra weight of the less valuable keyboard and monitor. Experience has shown that law enforcement personnel typically recover just the processor. The purpose of the sounding of the tones is to assure that law enforcement personnel will be alerted to the fact that the recovered computer has been registered at a certain registry in the event that the stolen computer is recovered without its keyboard or monitor. The visual display feature is an added help in identification in the event that the computer is recovered with the monitor and the keyboard—a situation which always occurs for laptop computers.

This invention further comprises means for transmitting the tones of the article no longer in the possession of the rightful owner to a registry. Decoder means are provided at the registry for listening to the tones and converting them to the combination of symbols constituting the code associated with the recovered article.

Means are provided at the registry for associating the code with the identity of the registered owner, and for communicating such identity to the site of the article. The transmission of the tones and the communication of the identity of the registered owner is preferably conducted over telephone lines.

In the event of the recovery of a stolen computer without a keyboard and monitor, a police officer can turn on the computer and transmit the resulting tones over telephone lines to the central registry by simply holding a regular telephone handset near the computer's speaker. The tones are received at the registry by a tone decoder that translates the tones to their alphanumeric symbols constituting the code assigned to that computer. This code is displayed on a screen at the registry. This code will then be searched for in a master file at the registry which contains all of the codes correlated with all of the registered owners.

If the computer is recovered along with its keyboard and monitor, the police officer can turn on the computer, enter the word "COP" on the keyboard, and a code will appear on the screen. The officer will then telephone the registry and give the code to an operator at the registry who will then search the master file for the owner registered to that code.

Thus, a simple telephone call, during which the police officer recites the unique permutation of symbols displayed on the computer screen, or transmits the tones corresponding to that permutation of symbols, enables the registry to promptly match up the permutation of symbols or tones with the correct owner, and preferably with a print-out of the correct owner's name, address and telephone number. This information is then given to the police officer who will then make arrangements to return the computer to its rightful owner. The registry is accessible to police officers anywhere, 24 hours a day, seven days a week. No matter where the owner moves or travels, or where the stolen computer is recovered, police officials can quickly locate the owner and return the personal property to the owner.

The code consists of a unique permutation of symbols. The code is exclusive and private and is of no use to anyone other than the owner of the personal property. Preferably, the aforementioned master symbol will be publicized as belonging exclusively to a particular central registry. Since all information as to recovered stolen computers may be conducted by telephone, the prompt return of the stolen goods to their rightful owners is expedited.

To prevent tampering with the program, the program is completely hidden on the computer's hard disk. It does not appear on the file directory of the computer, nor does it respond to normal DOS commands.

Another feature of this invention is embodied in the one-time-only installation of the program onto the computer's hard disk. This feature prevents a user from installing the program on more than one computer. Should the computer be sold by the owner, another program to remove the code can be made available.

Rather than loading the program into the computer by means of a diskette and disk drive, in still another application, the program can be built into the computer itself in one of the memory chips permanently mounted within the computer or subsequently added in an expansion slot. In this way, an owner need not be bothered with loading a diskette to secure registration since the computer will be assigned a code in the first instance directly from the manufacturer.

Each diskette or computer itself will be accompanied by a registration form that has been preprinted with the code. The user will be instructed to complete the registration form by inserting his or her name, address and telephone number, and to return the completed form to the registry responsible for maintaining the master file.

The diskette or computer may also be sold with warning decals to affix to the computer in order to warn potential thieves that the computer is identifiable by law enforcement agencies.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
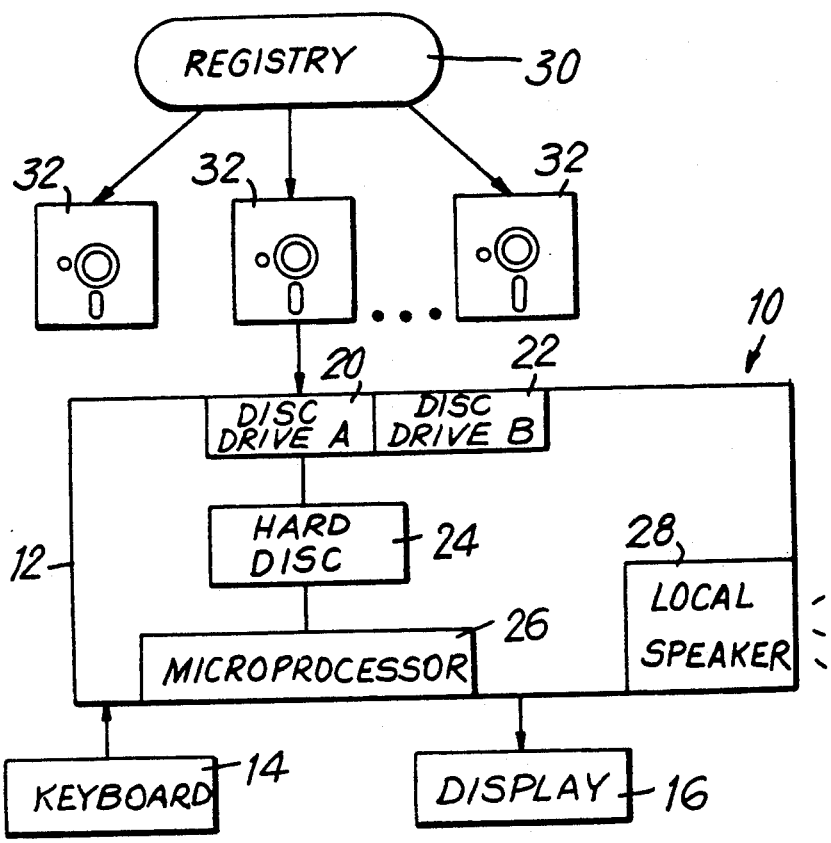
FIG. 1 is a diagram showing a computer to be assigned a unique code according to this invention by loading a diskette containing the code.

Referring now to the drawings, reference numeral 10 generally identifies a representative personal computer or laptop computer having a main processor unit 12, a keyboard 14, and a monitor or display 16. Unit 12 has floppy disk drives 20, 22, and an internal built-in hard disk 24 which is accessed by either disk drive and which is controlled by an internal microprocessor 26. The unit 12 also has a built-in speaker 28 operative for converting electrical to acoustic signals. In a conventional computer, the speaker 28 is driven by the microprocessor to emit a beep for alerting that a particular key on the keyboard has been incorrectly depressed or for verifying that the computer has been turned on.

In order to protect not only computer 10 but also thousands, if not millions, of other computers, a registry 30 assigns unique identification codes to the computers.

Each code is a different combination of symbols indicative of a respective registered owner of the particular computer. Each code is a unique permutation of human-readable symbols and may include numbers and/or letters. A exemplificative total number of symbols is eleven, with the first three symbols, in a preferred embodiment, being a group of letters, and the remaining eight symbols being numbers. The first three symbols are identical for all codes, and constitute a master symbol that identifies a single master code list, i.e. the particular registry 30 associated with the property identification system disclosed herein. For example, the first three symbols are preferably constituted by the letters "C", "O" and "P". Law enforcement personnel will be informed, either by direct advertising or by notification by appropriate governmental agencies, that the "COP" registry is the one to be consulted when inquiries are to be made concerning a code having the prefix "COP" or concerning a recovered computer which makes sounds when turned on. The remaining eight symbols are, of course, different, private, exclusive and unique for each computer.

The assignment of individual codes to individual computers can be accomplished in several ways. According to a preferred embodiment, the registry 30 can supply kits, each having a floppy diskette 32 programmed with a unique code. The diskette will be accompanied by a registration form that has been pre-printed with the code contained in the diskette's program. The user will compete the registration form by inserting his or her name, address and telephone number and returning it to the registry 30. Upon receipt, the registry 30 will enter the code and owner information into a master file, preferably maintained in a master computer 34.

Each kit also includes installation instructions for advising the user on the proper technique of loading the diskette into one of the disk drives 20 or 22.

Figure 3:
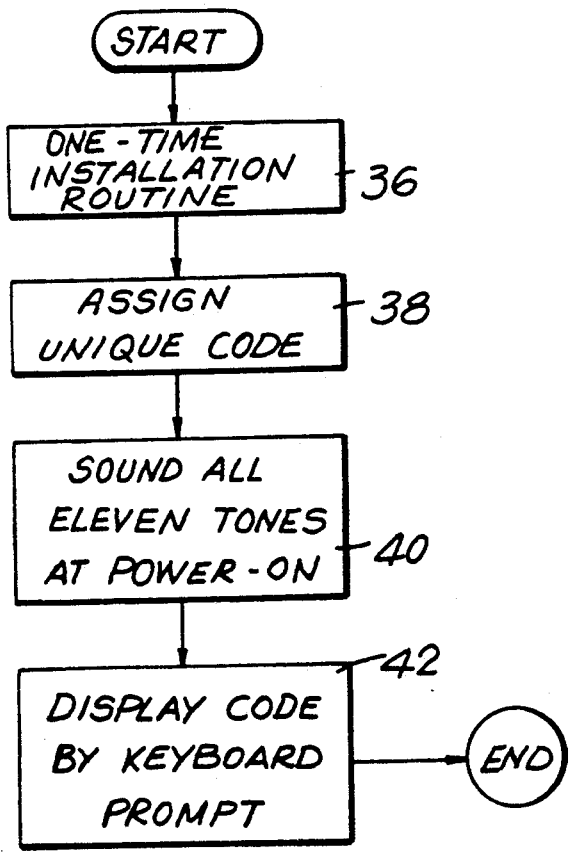
FIG. 3 is a flow chart of the program as used in the system of FIG. 1.
Figure 2:
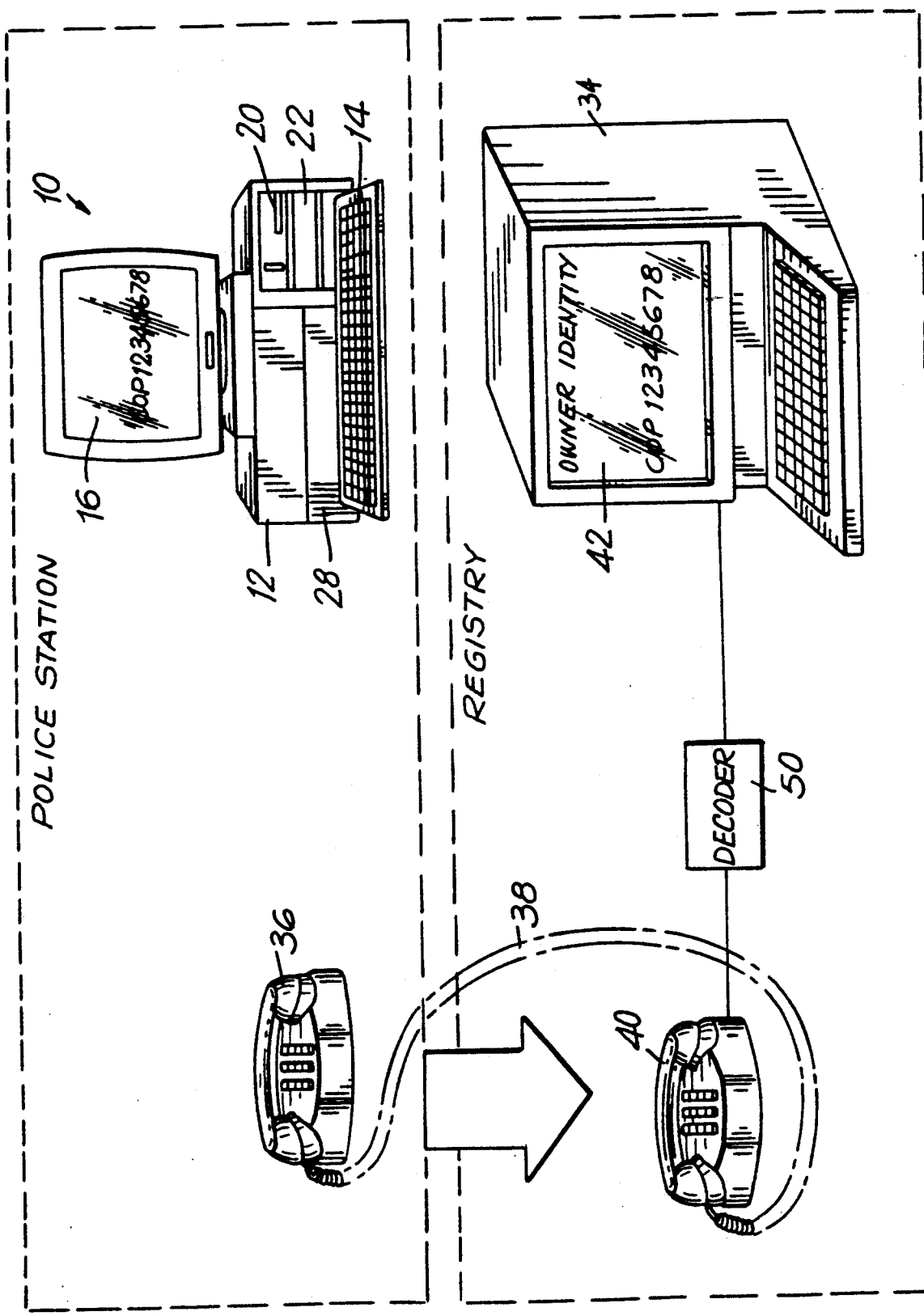
FIG. 2 is a diagram depicting the system for recovering the computer of FIG. 1.

Specifically, the program, as schematically set forth in FIG. 3, installs itself on the hard disk of the computer. Block 36 identifies the routine by which the program recognizes whether or not it has previously been installed on the hard disk. Once installation has been completed, block 36 will erase itself.

The program further includes a routine (see block 38) for assigning the code to the computer. Block 40 identifies a routine for energizing the speaker 28 to emit a unique plurality of audible tones upon activation of the computer, e.g. when power is turned on. Each tone corresponds to a respective symbol of the code assigned to a particular computer. The routines 38, 40 are installed at the beginning of the computer's start-up file which, in an MS-DOS operating system, is known as the AUTOEXE.BAT file. Hence, every time the computer is turned on, a tone code is sounded, each tone representing an alphabetic or numeric character of the code assigned to that computer.

Block 42 of the program is operative for visually displaying the code on the computer's display 16 when a predetermined word, e.g. "COP", is typed by an operator on the keyboard 14. Block 42 is installed in the root directory of the computer, and is hidden from normal DOS commands to deter tampering.

Once the program has been successfully installed in the hard disk 24, the diskette 32 is removed. The code has now been incorporated within the internal memory of the computer and accompanies the same no matter where it may be moved.

The tone consists, as mentioned above, of eleven different tones produced by the speaker 28. The first three tones represent the letters "C", "O" and "P" and are used to identify the code as belonging to the master file of the registry 30. The next eight tones represent numeric digits that identify the computer (example: COP12345678). No two codes are identical. Each tone is eleven milliseconds long and separated by an eleven-millisecond pause. The following TABLE I lists the frequency of each tone emitted by the speaker for master symbol letters "C", "O" and "P" and numerals 0-9:

TABLE I

| Symbol | Frequency (Hertz) |
|--------|-------------------|
| C | 420 |
| O | 570 |
| P | 697 |
| 9 | 770 |
| 8 | 852 |
| 7 | 941 |
| 6 | 1000 |
| 5 | 1080 |
| 4 | 1209 |
| 3 | 1336 |
| 2 | 1477 |
| 1 | 1633 |
| 0 | 1810 |

Thus, each symbol of the code has a uniquely identifiable tone associated therewith which can be decoded by a decoder at the registry, which is either a separate device or which can be installed within the master registry computer 34.

In the event of the recovery of a stolen computer without the keyboard and without the monitor, a police officer can transmit the tone code over telephone lines to the registry 30 by simply holding a regular telephone handset 36 near the speaker 28 and turning on the computer. The tones are received over telephone lines 38 at the registry 30 by another telephone handset 40 that is operatively connected to a tone decoder 50 that translates the tones to alpha-numeric form and displays the code on a screen 42 on the master computer 34. The master file is stored within the memory of the master computer 34. A registry operator will then use the code to locate the registered owner in the master file which contains all of the codes correlated to their registered owners. The registry operator can then utilize the handset 40 and advise the police officer at handset 36 as to the name, address and telephone number of the rightful owner so that arrangements can be made for the prompt return of the stolen computer.

If the computer is recovered along with its keyboard and monitor, as is likely with laptop computers, then the police officer can turn on the computer, type the word "COP" on the keyboard 14, and the code will appear on the display 16. The officer can telephone the registry over the telephone line 38 and give the code to the registry operator who will then search the master file on the master computer 34 in order to obtain the owner information corresponding to that particular code.

To prevent tampering with the program by a thief, the program is completely hidden on the computer's hard disk. It does not appear on the computer's file directory, nor does it respond to normal DOS commands. Once successfully installed onto the computer's hard disk, the program cannot be used again. Hence, a user cannot install the program on more than one computer. In the event of the contemplated sale of the computer, a program to remove the installation program from the computer can be sent from the registry to the owner in order to remove the assigned code. Rather than relying on a software program to assign the unique identification code and corresponding tone code to a computer, this invention also contemplates incorporating the program in an integrated circuit chip which can be mounted within the computer either permanently on one of the existing printed circuit boards or in one of the available expansion slots. Either the entire program or part of the program can be incorporated in said chip, depending on the amount of memory available. By incorporating the program within a chip that is sold with or added onto the computer, an owner need not be bothered with having to install the program from a diskette.

Although this invention has been specifically described in connection with computers with and without hard drives, it will be expressly understood that it can be extended to other electrical equipment such as television sets, radios, stereo equipment, and the like. The main requirement is that the protected piece of electrical equipment have an on-board speaker or analogous sound emitter which can be driven to emit sounds.

A preferred embodiment of the aforementioned program is set forth in the attached Appendix at pages A-1 through A-12. The main operational routine entitled "INSCOP" is operative to run all of the subroutines, and is set forth on page A-1. The subroutine on page A-2 is entitled "CHEKIT" and is operative to check if the aforementioned tone codes were previously recorded at the AUTOEXE. BAT start-up file. The subroutine on pages A-3 and A-4 are entitled "GET DRIVE", and is operative to locate the drive, preferably the hard disc drive on which the program is to be loaded. The subroutine on pages A-5 and A-6 are entitled "GET FORMAT", is an option, and is operative for preventing the clearing of the hard disc and the program installed thereon by format commands entered by the operator, or by an intruder. The subroutine on page A-7 is entitled "PUT IN AUTO", and is operative for loading the program into the beginning of the AUTOEXE. BAT file of the hard disc, which, as mentioned previously, is run each time the computer is turned on. The subroutine on page A-8 is entitled "COPY FILES", and is operative for opening a file on the hard disc, and for copying the program thereon. The subroutine on page A-9 is entitled "SETATTRIB", and is operative for preventing the program from being tampered with by conventional DOS operating commands. The subroutine on page A-10 is entitled "COP.-BAS", and is operative for loading the actual tone code previously installed by the manufacturer. As shown, the tone code in this example represents the letters "C", "O", "P", followed by the numbers 30105555 (see Table I). These digital tone codes are fed to the driver for the speaker to sound the same. Finally, the subroutine on pages A-11 and A-12 are entitled "COMMAND", and is operative for checking the command line of the program.

The decoder 50 advantageously includes a microphone for converting the emitted tones into electrical signals indicative of each tone, and a signal processor for using these electrical signals to drive a display driver operative for displaying the code symbol corresponding to each tone. The signal processor uses the reverse procedure outlined in the subroutine "COP.BAS" set forth on Appendix page A-10.

It will be understood that each of the elements described above, or two or more together, also may find a useful application in other types of constructions differing from the types described above.

While the invention has been illustrated and described as embodied in a tone code identification system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and; therefore, such adaptations should and are intended to be comprehended within the meaning and range of equivalence of the following claims.

What is claimed as new and desired to be protected by Letters Patent is set forth in the appended claims.

APPENDIX A

```
REM ********** INSCOP.BAS   - PROGRAM TO INSTALL COP - 4/8/89 - CRF *******
'$INCLUDE: 'QB.BI'
DECLARE SUB SHOWBANNER ()
DECLARE FUNCTION CPVERIFY% ALIAS "_cpverify" (BYVAL D%)

TYPE RECF
   F1 AS STRING * 10000
END TYPE
TYPE RECB
   F2 AS STRING * 3707
END TYPE
TYPE RECC
   F3 AS STRING * 108
END TYPE

DIM INREGS AS RegType, OUTREGS AS RegType
DIM REC1 AS RECF
DIM REC2 AS RECB
DIM REC3 AS RECC
DIM RECA$(100)

Blank$ = STRING$(75, 32)
D$ = " "
D% = 65
```

```
REM ***************** main loop *********************
CLS
IF CPVERIFY(D%) THEN
    LOCATE 23, 1
    PRINT "This diskette cannot be used to install COP":
    GOTO EOJ
END IF
GOSUB CHECKINS
IF D$ = "EXIT" THEN GOTO EOJ
CALL SHOWBANNER
GOSUB GETDRIVE
IF D$ = "EXIT" THEN GOTO EOJ
GOSUB GETFORMAT
IF D$ = "EXIT" THEN GOTO EOJ
GOSUB PUTINAUTO
IF D$ = "EXIT" THEN GOTO EOJ
GOSUB COPYFILES
IF D$ = "EXIT" THEN GOTO EOJ
GOSUB SETATTRIB
IF D$ = "EXIT" THEN GOTO EOJ
KILL "COP.EXE"
KILL "NOMAT.COM"
LOCATE 23, 21
PRINT "COP has been installed successfully          "
EOJ:
LOCATE 24, 1
END
REM **************** end main loop *********************

REM *********** ROUTINE TO CHECK FOR A PRIOR INSTALLATION **********

CHECKINS:

CHEKIT:
  NAM$ = "COP.EXE"
  NAM1$ = "NOMAT.COM"
  ON ERROR GOTO CHECKNG
  OPEN NAM$ FOR INPUT AS #1
  OPEN NAM1$ FOR INPUT AS #2
REM  OPEN NAM$ FOR BINARY AS #1
REM  OPEN NAM1$ FOR BINARY AS #2
REM  CNT% = 1
REM  GET #1, CNT%, REC3
REM  GET #2, CNT%, REC3
  CLOSE
  RETURN

CHECKNG:
  RESUME CKNG
CKNG:
  CLOSE
  LOCATE 23, 1
  PRINT "This diskette has already be used to install COP"
  D$ = "EXIT"
  RETURN

REM ***************ROUTINE TO GET THE DRIVE****************

GETDRIVE:
CLS
LOCATE 1, 1: PRINT CHR$(218);
FOR C% = ; TO 78: PRINT CHR$(196); : NEXT C%
PRINT CHR$(191)
FOR C% = 2 TO 23
   LOCATE C%, 1: PRINT CHR$(179);
   LOCATE C%, 80: PRINT CHR$(179);
NEXT C%
LOCATE 3, 1: PRINT CHR$(195);
FOR C% = 1 TO 78: PRINT CHR$(196); :NEXT C%
PRINT CHR$(180): LOCATE 24, 1: PRINT CHR$(192);
FOR C% = 1 TO 78: PRINT CHR$(196); : NEXT C%
```

```
PRINT CHR$(217);
LOCATE 2, 23
PRINT "COP  (tm) INSTALLATION PROGRAM   V1.0"
LOCATE 6, 18
PRINT "COP MUST BE INSTALLED ON YOUR PC'S HARD DISK"
LOCATE 7, 18
PRINT STRING$(44, 196)
LOCATE 9, 12
PRINT "1. Enter the name of the Disk Drive to install COP on: ";
LOCATE 11, 12
PRINT "2. Press ENTER"
LOCATE 15, 15
PRINT "NOTE:   The name of the drive you enter"
LOCATE 16, 24
PRINT "should be the letter of the hard"
LOCATE 17, 24
PRINT "disk your PC boots from."
LOCATE 18, 22
PRINT "(Change only if other than drive C: )"
LOCATED 23, 23
PRINT "Press ESC to quit this program"
Getit:
500 R = 9: C = 67: Cl = C: Buf$ = "C"
506 LOCATE R, C: PRINT Buf$; : LOCATE R, C, 1
510 LOCATE R + 1, 2: PRINT Blank$: LOCATE R, C, 1
512 X$ = INKEY$: IF X$ = "" THEN 512
515 IF (X$) CHR$(64) AND X$ (CHR$122) THEN 550
518 OPT = ASC(X$): X$ = CHR$(OPT AND 127)
520 IF X$ = CHR$(13) THEN 580
522 IF X$ = CHR$(27) THEN GOTO Dono
530 IF X$ = CHR$(8) AND C = Cl + 1 THEN C=C-1: LOCATE R,C: Buf$=""
    + RIGHT$(Buf$, (LEN(Buf$) - 1)): LOCATE R,Cl: PRINT Buf$:GO TO 510
535 IF X$ = CHR$(8) AND C ) Cl THEN C=C-1: LOCATE R,C-1: PRINT CHR$(32)
    :Buf$ =LEFT$(Buf$,C-Cl) + "" + RIGHT$(Buf$, (LEN(Buf$)-(C-Cl)-
    1)): LOCATE R, Cl: PRINT Buf$: GOTO 510
540 PRINT CHR$(7): GOTO 510
550 IF C = Cl + 1 THEN PRINT CHR$(7); : GOTO 510
560 Buf$ = LEFT$(Buf$, C-Cl) + X$ + RIGHT$(Buf$, LEN(Buf$) -
    (C - Cl + 1))
570 LOCATE R, C: PRINT CHR$(32); : LOCATE R, Cl: PRINT Buf$:
    C = C + 1: GOTO 510
590 D$ = Buf$
Openit:
    DRV$ = D$ + ":/TMPCOP"
    'ON ERROR GOTO DNG
    OPEN DRV$ FOR OUTPUT AS #1
    CLOSE #1
    KILL DRV$
    LOCATE 23, 23
    PRINT "Press ESC to quit this program"
    RETURN
Dono:
    LOCATE 23, 2
    PRINT Blank$
    D$ = "EXIT"
    RETURN
DNG:
    RESUME DN1
DN1:
    LOCATE 23, 23
    PRINT "Invalid Drive, Try Again
    Delay = 2
    Df = 0
    ds = TIMER
    WHILE (Df (ds + Delay))
       Df = TIMER
    WEND
    LOCATE 23, 23
    PRINT "Press ESC to quit this program"
    GOTO Getit
```

REM*********ROUTINE TO GET THE FORMAT OPTION*********

GETFORMAT:

FOR C% = 9 TO 18
    LOCATE C%, 2
    PRINT Blank$;
NEXT C%

LOCATE 4, 26
PRINT "Optional Feature: COPGUARD"
LOCATE 6, 12
PRINT "COPGUARD CAN PROTECT YOUR HARD DISK FROM BEING RE-FORMATED"
LOCATE 7, 12
PRINT STRING$(58, 196)
LOCATE 9, 12
PRINT "1. Do you wish to prevent unauthorized formatting (Y/N)? ";
LOCATE 11, 12
PRINT "2. Press ENTER"
LOCATE 15, 15
PRINT "NOTE:  If you enter 'Y' your hard disk"
LOCATE 16, 24
PRINT "format command will be disabled."
LOCATE 18, 24
PRINT "If you enter 'N', your hard disk"
LOCATE 19, 24
PRINT "can be reformatted ... Reformatting"
LOCATE 20, 24
PRINT "will remove your COP protection!"
LOCATE 23, 23
PRINT "Press ESC to quit this program"

Getfmt:
600 R = 9: C = 69: C1 = C: Buf$ = "Y"
606 LOCATE R, C: PRINT Buf$; ; LOCATE R,C,1
610 LOCATE R + 1, 2: PRINT Blank$: LOCATE R,C,1
612 X$ = INKEY$: IF X$ = "" THEN 612
615 IF (X$) CHR$(64) AND X$ (CHR$(122)) THEN §%)
618 OPT = ASC(X$): X$ = CHR$(OPT AND 127))
620 IF X$ = CHR$(13) THEN 680
622 IF X$ = CHR$(27) THEN GOTO Dono
630 IF X$ = CHR$(8) AND C=C1 + 1 THEN C = C - 1: LOCATE R.C:
Buf$="" + RIGHT$(Buf$, (LEN(Buf$)-1)): LOCATE R,C1: PRINT Buf$:GO TO 610
635 IF X$ = CHR$(8) AND C) C1 THEN C = C -1: LOCATE R,C - 1: PRINT
    CHR$(32);: Buf$ = LEFT$(Buf$, C-C1) + "" + RIGHT$(Buf$, (LEN
    (Buf$) -(C-C1)-1)): LOCATE R,C1: PRINT Buf$: GOTO 610
640 PRINT CHR$(7): GOTO 610
650 IF C = C1 + 1 THEN PRINT CHR$(7); : GOTO 610
660 Fuf$ = LEFT$(Buf$, C-C1) + X$ + RIGHT$(Buf$, LEN(Buf$)-(C-C1+1))
670 LOCATE R,C: PRINT CHR$(32); :LOCATE R, C1: PRINT Buf$: C=C =1:GOTO61
680 FANS$ = UCASE$(Buf$)

Chkit:
    IF FANS$ = "Y" OR FANS$ = "N" THEN RETURN
    LOCATE 23, 23
    PRINT " Invalid Entry, Try Again
    Delay = 2
    Df = 0
    ds = TIMER
    WHILE (Df ( (ds + Delay))
        Df = TIMER
    WEND
    LOCATE 23, 23
    PRINT "Press ESC to quit this program"
    GOTO Getfmt

```
REM ******************* PUT IN AUTOEXEC ROUTINE ***************

PUTINAUTO:
   NAM$ = "COP /N"
   NAM1$ = "NOMAT"
   FIL$ = D$ + ":\AUTOEXEC.BAT"
   ON ERROR GOTO Makeit
   OPEN FIL$ FOR INPUT AS #1
   A$ = "   "
   FOUND = 0

Putit:
   CNT% = 1
   WHILE (NOT EOF(1) AND NOT FOUND)
      LINE INPUT #1, RECA$(CNT%)
      IF RECA$(CNT%) = NAM$ THEN FOUND = -1
      CNT% = CNT% + 1
   WEND
   CLOSE #1
   IF FOUND THEN GOTO Autong Makeit:
   RESUME Mak1
Mak1:
   C% = 1
   ON ERROR GOTO Putng
   OPEN FIL$ FOR OUTPUT AS #2
   PRINT #2, NAM$
   IF FANS$ = "Y" THEN PRINT #2, NAM1$
   WHILE C% < CNT%
      PRINT #2, RECA$(C%)
      C% = C% + 1
   WEND
   CLOSE
   RETURN Putng:
   RESUME Put1
Put1:
   LOCATE 23, 10
   PRINT "An error has occured attemping to update AUTOEXEC.BAT"
   D$ = "EXIT"
   RETURN Autong:
   LOCATE 23, 23
   PRINT "COP has already been installed       "
   D$ = "EXIT"
   RETURN REM ***************** FILE COPY ROUTINE *********************
COPYFILES:
   ON ERROR GOTO COPYNG
   LOCATE 23, 23
   PRINT "COP Installation in Progress...              ";
   OPEN "COP.EXE" FOR BINARY AS #3
   OPEN D$ + ":\COP.EXE" FOR BINARY AS #4
   CNT% = 1
   GET #3, CNT%, REC1
   PUT #4, CNT%, REC1
   CNT% = 10001
   GET #3, CNT%, REC1
   PUT #4, CNT%, REC1
   CNT% = 20001
   GET #3, CNT%, REC1
   PUT #4, CNT%, REC1
   CNT% = 30001
   GET #3, CNT%, REC2
   PUT #4, CNT%, REC2
   CLOSE
```

```
    IF FANS$ = "N" THEN RETURN
    OPEN "NOMAT.COM" FOR BINARY AS #3
    OPEN D$ + ":\NOMAT.COM" FOR BINARY AS #4
    CNT% = 1
    GET #3, CNT%, REC3
    PUT #4, CNT%, REC3
    CLOSE
RETURN

COPYNG:
    RESUME Cop1
Cop1:
    LOCATE 23, 11
    PRINT "An error has occured attemping to install COP on drive "; D$
    D$ = "EXIT"
    RETURN REM ***************** SET ATTRIBUTE TO HIDDEN ********************
SETATTRIB:
    FILNAM$ = D$ + ":\COP.EXE" + CHR$(0)
    INREGS.ax = &H4300
    INREGS.dx = SADD(FILNAM$)
    CALL INTERRUPT(&H21, INREGS, OUTREGS)
    IF (&H1 AND OUTREGS.flags) <> 0 THEN GOTO SETNG
    INREGS.cx = OUTREGS.cx OR &H2
    INREGS.ax = &H4301
    CALL INTERRUPT(&H21, INREGS, OUTREGS)
    IF (&H1 AND OUTREGS.flags) <> 0 THEN GOTO SETNG IF FANS$ = "N" THEN RETURN
    FILNAM$ = D$ + ":\NOMAT.COM" + CHR$(0)
    INREGS.ax = &H4300
    INREGS.dx = SADD(FILNAM$)
    CALL INTERRUPT(&H21, INREGS, OUTREGS)
    IF (&H1 AND OUTREGS.flags) <> 0 THEN GOTO SETNG
    INREGS.cx = OUTREGS.cx OR &H2
    INREGS.ax = &H4301
    CALL INTERRUPT(&H21, INREGS, OUTREGS)
    IF (&H1 AND OUTREGS.flags) <> 0 THEN GOTO SETNG
    RETURN SETNG:
    LOCATE 23, 14
    PRINT "An error has occured attemping to set the attribute ";
    D$ = "EXIT"
    RETURN SUB SHOWBANNER STATIC
    CLS
    PRINT : PRINT
    PRINT "                              COP (tm)"
    PRINT : PRINT : PRINT
    PRINT "                     COMPUTER OWNER PROTECTION"
    PRINT "                         Installation Program"
    PRINT : PRINT
    PRINT "                  Copyright (c) 1989, Identifax, Inc."
    PRINT "                           Patent Pending"
    PRINT : PRINT : PRINT : PRINT
    PRINT "           All rights reserved. COP, Identifax Computer Recovery"
    PRINT "        Bureau and Identifax are all trademarks of Identifax, Inc.
    Delay = 4
    Df = 0
    ds = TIMER
    WHILE (Df < (ds + Delay))
        Df = TIMER
    WEND
END SUB
```

```
REM ********** COP.BAS  - PROGRAM TO IDENTIFY A PC - 4/8/89 - CRF *******
DECLARE SUB MKDBOX (T%, B%, L%, R%)
DECLARE SUB MKBOX (T%, B%, L%, R%)
DIM Note(11), Order(10)
Delay = .15
MKSND = -1

DATA 0420, 0570, 0697, 1336, 1810, 1633, 1810, 1080, 1080, 1080, 1080
FOR i = 1 TO 11
   READ Note(i)
NEXT i DATA 1810, 1633, 1477, 1336, 1209, 1080, 1000, 0941, 0852, 0770
FOR i = 1 TO 10
   READ Order(i)
NEXT i REM***********CHECK FOR COMMAND LINE********
CL$ = COMMAND$
L = LEN(CL$)
IF L ) 0 AND MID$(CL$, 2, 1) = "N" THEN MKSND = 0

Regnum$ = "COP
FOR i = 1 TO 11
   j = 1
   WHILE (j ( 11)
   IF Note(i) = Order(j) THEN MID$(Regnum$, i) = MID$(STR$(j-i),2):j=11
   j = j + 1
   WEND
NEXT i Df = 0
FOR i = 1 TO 11
   Ds = TIMER
   WHILE (Df ( (Ds + Delay))
      Df = TIMER
   WEND
   SOUND Note(i), 2
   NEXT i IF MKSND THEN
   CLS
   T% = 1: B% = 23: L% = 1: R% = 79
   CALL MKDBOX(T%, B%, L%, R%)
   LOCATE 4, 22
   PRINT "This Computer is Registered with"
   LOCATE 7, 19
   PRINT "IDENTIFAX COMPUTER RECOVERY BUREAU (tm)"
   T% = 11: B% = 13: L% = 20: R% = 55
   CALL MKBOX(T%, B%, L%, R%)
   LOCATE 12, 22
   PRINT "Registration Number: "; Regnum$
   LOCATE 17, 20
   PRINT "To locate owner call: 1 (800) 645-5404"
   LOCATE 18, 19
   PRINT "In New York State call: 1 (800) 832-5283"
   LOCATE 24, 1
END IF
Df = 0
Ds = TIMER
WHILE (Df ( (Ds + Delay))
   Df = TIMER
WEND
```

```
SUB MKBOX (T%, B%, L%, R%) STATIC
   LOCATE T%, L%: PRINT CHR$(218);
   FOR C% = 1 TO R% - L% - 1: PRINT CHR$(196); : NEXT C%
   PRINT CHR$(191)
   FOR C% = T% + 1 TO B% - 1
      LOCATE C% = T% + 1 TO B% - 1
      LOCATE C%, R%: PRINT CHR$(179);
   NEXT C%

LOCATE B%, L%: PRINT CHR$(192);
   FOR C% = ; TO R% - L% - 1: PRINT CHR$(196); : NEXT C%
   PRINT CHR$(217);
END SUB

SUB MKDBOX (T%, B%, L%, R%) STATIC
   LOCATE T%, L%: PRINT CHR$(201);
   FOR C% = 1 TO R% - L% - 1: PRINT CHR$(205); : NEXT C%
   PRINT CHR$(187)

FOR C% = T% + 1 TO B% - 1
      LOCATE C%, L%: PRINT CHR$(186);
      LOCATE C%, R%: PRINT CHR$(186);
   NEXT C%

LOCATE B%, L%: PRINT CHR$(200);
   FOR C% = 1 TO R% - L% - 1: PRINT CHR$(205); : NEXT C%
   PRINT CHR$(188);
END SUB
```

I claim:

1. An identification system for identifying registered owners of activatable, portable articles of personal property of the type having a sound emitter, said system comprising:
   (a) means for incorporating unique identification codes with the articles, each code being a different combination of symbols indicative of a registered owner of a respective article; and
   (b) audible tone means for energizing each sound emitter to emit a unique plurality of audible tones upon activation of the respective article, each audible tone corresponding to a respective symbol of the corresponding code incorporated with the respective article, the emission of the audible tones serving as an auditory notification that the respective article has a registered owner.

2. The system according to claim 1, wherein at least one of the symbols of each code is identical for all the codes and constitutes a master symbol identifying a specific master code list, the balance of the symbols of each code in combination with the master symbol being a unique permutation of symbols on the master code list.

3. The system according to claim 2, wherein the master symbol is the first of all the symbols in the codes, and wherein the audible tone means emits an identical audible master tone corresponding to the master symbol for all the codes, the emission of the audible master tone identifying the master code list.

4. The system according to claim 3, wherein the master symbol is a first group of symbols in the codes, and wherein the audible tone means emits an identical combination of audible master tones corresponding to the first group of symbols.

5. The system according to claim 1, wherein at least one of the articles is a computer having an on-board speaker as the sound emitter, and an on-board memory; and wherein the incorporating means includes means for loading one of the codes into the on-board memory; and wherein the audible tone means is operatively connected to the speaker to drive the same to emit the audible tones upon activation of the computer.

6. The system according to claim 5, wherein the on-board memory is a hard disk, and wherein the loading means accesses the hard disk by means of a disk drive.

7. The system according to claim 5, wherein the computer includes a display, and wherein the code is visually displayed on the display upon activation of the computer.

8. The system according to claim 7, wherein the computer includes a keyboard, and wherein the code is visually displayed on the display upon command from the keyboard.

9. The system according to claim 6, wherein the incorporating means and the audible tone means constitute a software program loaded into the hard disk in a start-up file that is automatically run by the computer upon activation of the computer.

10. The system according to claim 1, wherein each code is a combination of human-recognizable symbols.

11. The system according to claim 10, wherein the symbols are alpha-numeric characters.

12. The system according to claim 1; and further comprising means for transmitting the audible tones of an article no longer in the possession of the registered owner to a registry; means at the registry for decoding the audible tones to the combination of symbols constituting the unique identification code associated with the article; means at the registry for associating the unique identification code with the identity of the registered owner; and means for communicating the identity of the registered owner to the site of the article.

13. The system according to claim 12, wherein the transmitting means and the communicating means are telephone links.

* * * * *